US005987229A

United States Patent [19]

Bender et al.

[11] Patent Number: 5,987,229

[45] Date of Patent: Nov. 16, 1999

[54] METHOD FOR CONTROLLING THE PASSAGE OF MEDIA THROUGH MIXED SPEED PRINT PROCESSES

[75] Inventors: Michael Donald Bender; Cuong Manh Hoang; Allen Patrick Johnson, all of Lexington, Ky.; Gregory John Sherwood, Littleton, Colo.; Aaron Charles Yoder, Lexington, Ky.

[73] Assignee: Lexmark International, Inc., Lexington, Ky.

[21] Appl. No.: 08/978,882

[22] Filed: Nov. 26, 1997

[51] Int. Cl.$^6$ .................................................. G06F 15/00

[52] U.S. Cl. ......................... 395/114; 395/101; 395/111; 395/112; 358/296; 355/89

[58] Field of Search .................................... 395/114, 104, 395/101, 102, 108, 112, 113, 111; 355/32, 88, 89; 358/296, 401, 524; 399/43, 46, 54, 178, 179, 298, 299

[56] References Cited

U.S. PATENT DOCUMENTS

| | | | |
|---|---|---|---|
| 3,781,474 | 12/1973 | Rice, Jr. | 178/25 |
| 4,451,027 | 5/1984 | Alper | 271/10 |
| 4,463,435 | 7/1984 | Cavill | 364/519 |
| 4,469,460 | 9/1984 | Hughes et al. | 400/322 |
| 4,789,949 | 12/1988 | Malcolm | 364/519 |
| 4,833,626 | 5/1989 | Malcolm | 364/519 |
| 4,994,988 | 2/1991 | Yokoi | 364/519 |
| 5,056,771 | 10/1991 | Beck et al. | 271/114 |
| 5,081,596 | 1/1992 | Vincent et al. | 395/104 |
| 5,140,674 | 8/1992 | Anderson et al. | 395/111 |
| 5,179,637 | 1/1993 | Nardozzi | 395/114 |
| 5,287,194 | 2/1994 | Lobiondo | 358/296 |
| 5,299,296 | 3/1994 | Padalino et al. | 395/112 |
| 5,442,385 | 8/1995 | Moon et al. | 347/43 |
| 5,489,926 | 2/1996 | Arbeiter | 347/16 |

*Primary Examiner*—Dov Popovici
*Assistant Examiner*—Mark Wallerson
*Attorney, Agent, or Firm*—John A. Brady

[57] ABSTRACT

For a multiprocess application including a plurality of work stations at which the application processes proceed simultaneously, such as a printer including serially aligned laser and inkjet print engines, a method of controlling job throughput includes providing a queue for each work station, providing job data to the queues for a plurality of jobs, and consecutively tracking for the jobs the progress of the process corresponding to the rate-determining step for the application for each of the jobs so that as each job is completed at a particular work station the work station begins the process of the work station for the next job.

8 Claims, 2 Drawing Sheets

METHOD FOR CONTROLLING THE PASSAGE OF MEDIA THROUGH MIXED SPEED PRINT PROCESSES

FIELD OF THE INVENTION

The present invention relates generally to a method for controlling media throughput in printing devices including a plurality of processes that proceed at different rates; and more particularly, to the control of paper throughput in a hybrid printer capable of combining laser and inkjet printing technologies in processing print jobs from a plurality of networked computers.

BACKGROUND OF THE INVENTION

In many printing applications it is often necessary to use both laser and inkjet printing technologies to successfully produce a desired print job. For example, a print job comprising a multiple page document might include some pages with text only, some pages with color graphics only, and some pages which include both text and color graphics. To handle such or similar situations, a hybrid printer can be used in which “non-color” pages are printed by a laser print engine, the “color” pages are printed by an inkjet print engine, and the “combination color and non-color” pages are printed first by the laser print engine printing the black plane of a page and then by the inkjet print engine printing or imaging the color portion of the page (the latter which may include, inter alia, printing the color black). In such printer configurations the laser and inkjet print engines typically are aligned serially, although provision may be made for media to bypass the inkjet print engine in totally non-color print jobs.

Laser print engines generally are “non-stop” printing devices capable of very high media throughput. Print time for a laser print engine is for most practical purposes independent of the amount of data coverage on a page. Inkjet print engines, however, are generally “stop and go” printing mechanisms requiring significantly higher mechanical overhead. Print time for an inkjet print engine is a function of the amount and distribution of ink to be placed on a page. Typically, an inkjet print engine is capable of much lower media throughput as compared to a laser print engine.

Accordingly, one problem associated with a hybrid printer combining laser and inkjet printing technologies, particularly in situations in which the hybrid printer serves a plurality of networked computers, is throughput “bottleneck,” i.e., an operating condition in which the laser print engine cannot print at up to its maximum capacity because it must wait for pages to clear out of the inkjet print engine. Such an operating condition represents an inefficiency which adversely impacts the overall rate of media throughput in the printer.

SUMMARY OF THE INVENTION

In accordance with the present invention, a method is provided by which both black (mono-color) and color (multi-color) or partially color pages are printed with a hybrid printer with improved overall throughput. The hybrid printer comprises a combination of mono laser and color inkjet technologies, in which mono jobs, i.e., print jobs made up of only non-color pages, are printed through a laser process and then are stacked in one printer output tray, and in which color jobs, i.e., print jobs with any color content, exit the laser print engine and are diverted by a movable gate or other suitable media travel shifting or direction changing means through the color inkjet device to a second output tray. Throughput advantage is gained by separating processed pages, i.e., the page representations created when page data from a computer, network connection, global information network, or other source is processed by the hardware and software architecture of the printer into a usable form as required by the printer’s print engines, into two buffer-like printing queues, i.e., internal “lists” of the page representations to be printed. The queues preferably are filled and emptied on a “first in, first out” basis, thus enabling the laser print engine to work on one part of a print job at the same time the inkjet device is working on a separate part or a different job. Further advantage also is gained by ensuring that downtime is minimized for both the laser and inkjet print engines, i.e., that one page enters the color print engine as the previous color page exits, so that both printing devices are kept as busy as possible.

In accordance with the present invention, a first color page from a color queue, i.e., a page already started in the print process, is tracked until the next color page is launched. That second color page then is tracked until it is time to track the next color page launched, and so on. By consecutively tracking one page at a time from the color queue through the print process, so that a color page enters the inkjet print engine as another previous page exits, greater printer throughput levels are achieved.

There are four time values associated with the present method for controlling printer throughput: the time it takes to complete the printing of a page once the page enters the inkjet print engine (referred to as “Ti” herein); the time it takes to render a mono image onto a page (referred to as “Tm” herein); and the times required for a page to travel from a media source (e.g., paper tray or fixed platform) to the inkjet and mono print engines (referred to herein as “Tpi” and “Tpm”, respectively). Typically, microprocessors are able to render color planes and transfer the color data to inkjet printing devices faster than the devices can image the color planes. Accordingly, Ti preferably is estimated by calculating the mechanical time required for the inkjet to image the color data on the page. In some applications, however, particularly where a microprocessor cannot keep up with the speed of the inkjet’s mechanical assembly, Ti may be estimated by predicting color rendering times or by ascertaining or predicting the duration of the rate determining step for the inkjet print engine, which may account for or include, e.g.: the time required for the movement of the print head to image the page; any required time delays; any other rate-influencing factors associated with the involved application or its processes; etc. The value of Ti thus may vary widely as a function of, e.g., page color content, the inkjet printing mode (e.g., bi-directional vs. non-bi-directional), and the print quality setting for the inkjet device as set by a user (e.g., “draft” or “quality” printing).

The value of Tm is estimated by looking at the black plane of a page, and the value will depend upon the hardware and software architecture of the laser printer involved in the particular application. The value of Tm may vary widely depending upon how the pages to be printed are formatted. Rendering a page may comprise a straight transfer of data, or may involve some further processing of data, e.g., decompression of page data. Typically, the laser printer portion of a hybrid printing device is a non-stop device in which the rendering of the black plane of a page becomes of highest priority to the microprocessor when the page is under the black imaging point. Any black plane rendering that occurs while a page is in the inkjet device thus starves the inkjet device of microprocessor cycles. Accordingly, and in accordance with the present invention, any initial or early estimates of the time required for the inkjet device to finish with the color planes for a page should be adjusted continuously as new pages are launched into the system.

The method of the present invention may be embodied in the form of a control program residing within printer architecture wherein decisions are made as to which page of a print job should be the next page printed. Typically, such printer architecture comprises a control system including a plurality of sensors that track the progress of pages within the system, and provide signals to a microprocessor including the control program that directs the various printing operations.

The present invention is implemented in the preferred embodiment with one tracking timer (referred to herein as "Timer"), the value of which takes on different meanings throughout the printing process. When a color page is launched, i.e., the media upon which the color page is to be printed exits the media source and enters the pathway through the printer, Timer assumes the value of the predicted time until completion for the page. Timer then is decremented on an interval and becomes a running time until completion. Each time a new page is launched Timer is analyzed to determine if Timer needs to be changed, i.e., modified by adding in Tm, the time required for the next page's black plane to be rendered. Timer also is analyzed to determine if a color page can be launched or if a color page should be classified as "waiting." Once there is a waiting color page in the color queue, Timer represents the time until that waiting page can be launched, and once the next color page is launched, Timer again reverts to its initial meaning, i.e., the predicted time until completion for the current color page in the process.

In accordance with the present invention, the top page in the color queue assumes one of three states: "unclassified," "waiting," or "ready". The unclassified state is the default state for every page as it starts at the top of the color queue. The waiting state indicates that Timer is counting down to the point where the color page can be launched. A ready state indicates that Timer has expired, meaning that the page in the color queue can be launched at the next available time. Thus, every page starts in the unclassified state and may be launched at first inspection by the control program, or it may be put into the waiting state. A page in the waiting state remains there and the value of Timer is adjusted on a timing interval until the page can be put in the ready state and is subsequently launched.

DETAILED DESCRIPTION OF THE INVENTION

In accordance with the present invention, set out herein is an illustration of a preferred routine in programming design language from which source and machine code are derivable.

Part 1: At Page Launch

```
if (at least one page waiting to be launched)
  do while (no page launched)
    if (Color Queue has page on top not in "waiting" state)
      nextpage = page at top of Color Queue
  else
      nextpage = page at top of Mono Queue
  Calculate Ti, Tm, Tpi and Tpm for nextpage
  if (nextpage is Color)
      if (nextpage is classified as "ready")
        Timer ==Ti + Tpi
        Launch nextpage
      else (nextpage must be unclassified)
        /* See if current color page in process will be out of the way before nextpage reaches black imaging point.
*/
        /* If so, launch this page.                                                                   */
        if (Timer < Tpm)
            Timer = Ti + Tpi
            Launch nextpage
        else
        /* Adjust time until completion for color page in process by the time to render black for nextpage */
        Timer = Timer + Tm
        /* See if nextpage will get to the inkjet device before current page is done. If not, launch */
        if (Tpi>Timer)
              Timer = Ti + Tpi
              Launch nextpage
            else
              /* set Timer to value that when expired, nextpage can be classified as "ready" to be launched */
              Timer = Timer - Tpi
              Classify nextpage as "waiting"
            endif
        endif
      endif
    else (nextpage is from the Mono Queue)
      if (Timer>Tpm)
        /* Adjust time until completion for color page in process by the time to render black for nextpage */
        Timer = Timer + Tm
      endif
```

-continued

```
    Launch nextpage
  endif
 enddo
endif
```

Part 2: At Timer Interval

Decrement Timer

If (Timer is 0 and Color Queue's top page is "waiting")

Classify top page of Color Queue as "ready"

Figure 1:
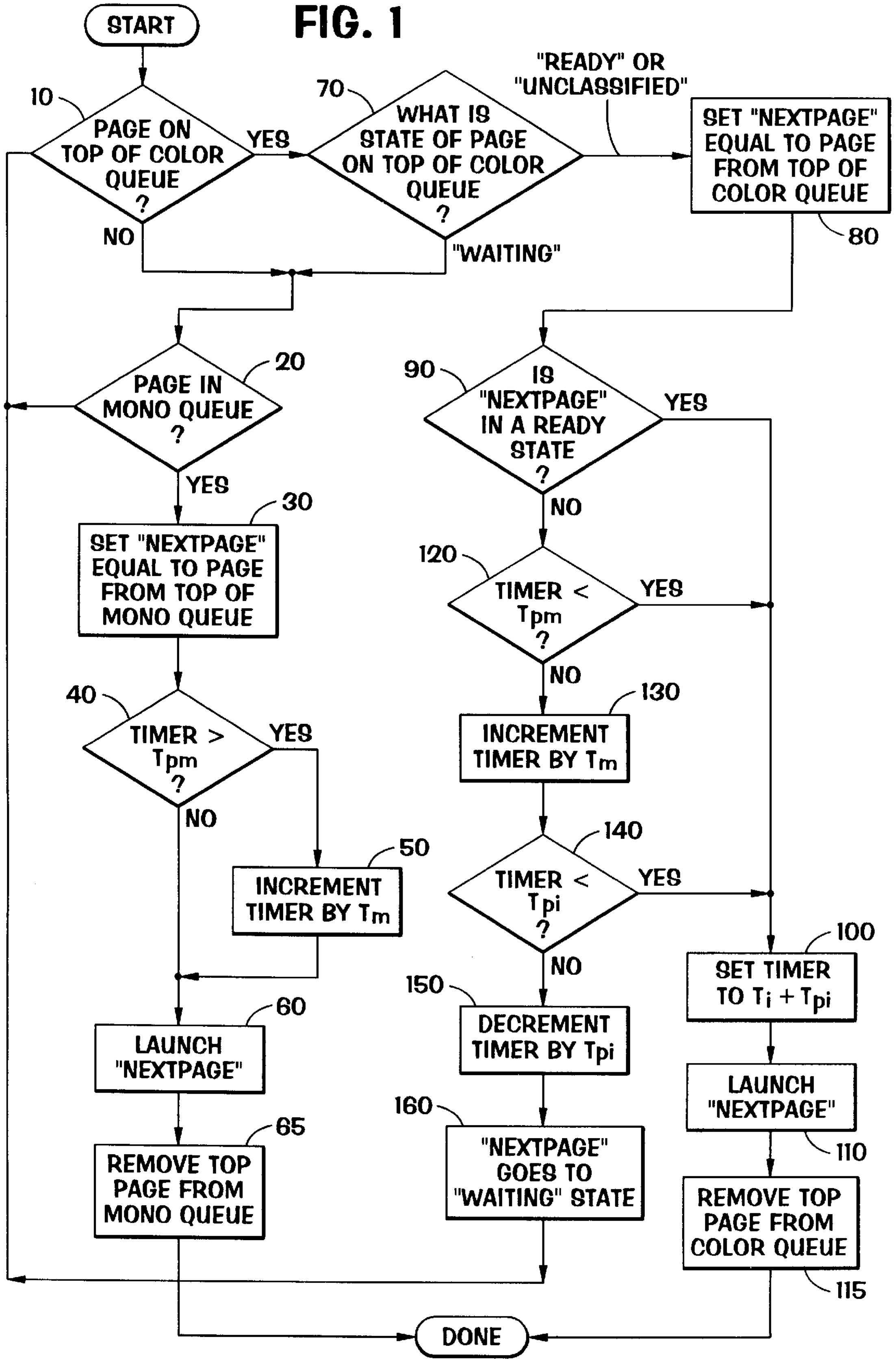
FIG. 1 is a flow chart illustrating the major elements of the operations carried out by a control program embodying the method of the present invention.
Figure 2:
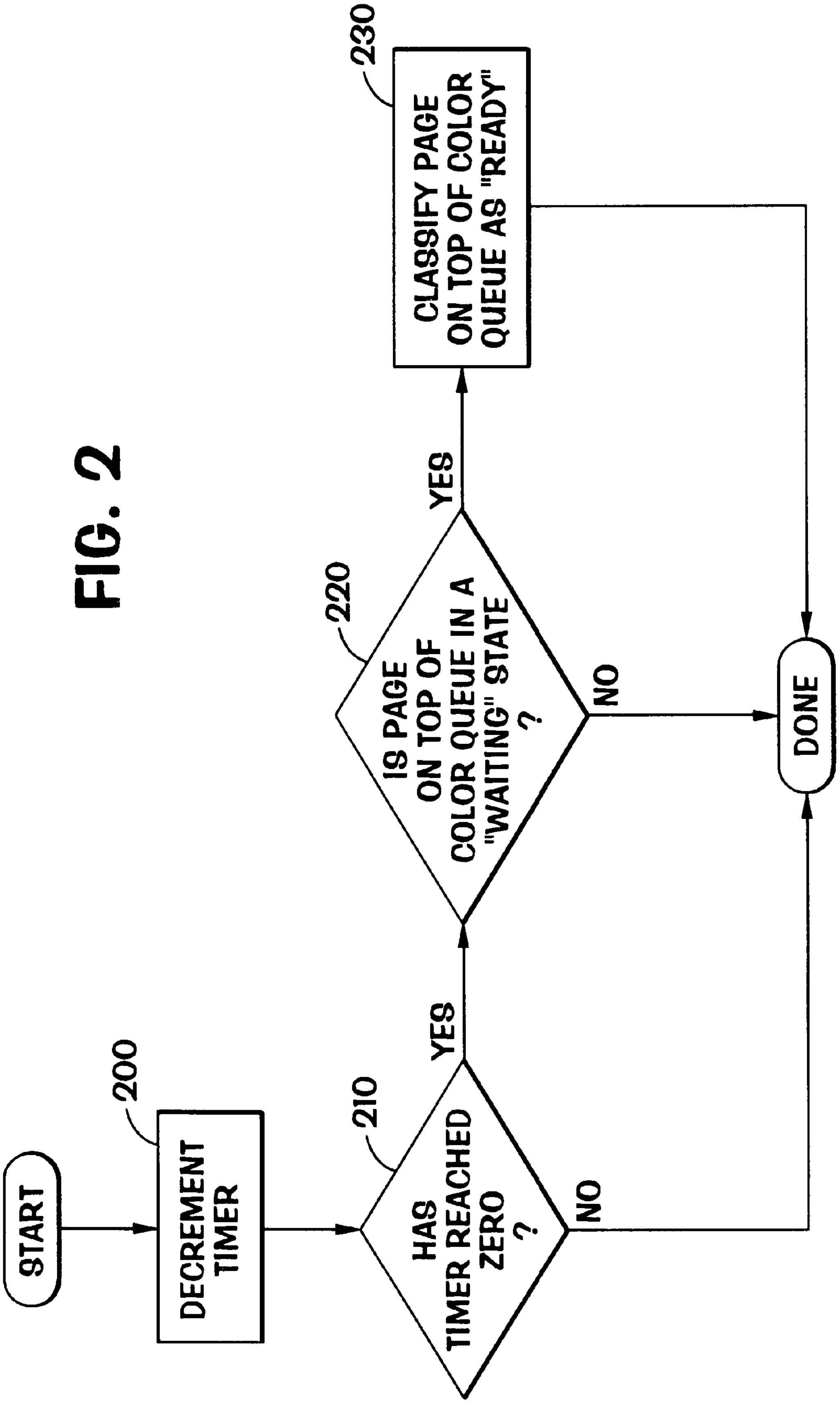
FIG. 2 is a flow chart illustrating the major elements of the operations carried out by the control program illustrated in FIG. 1 at the "Decrement Timer" step.

The above preferred routine is shown graphically in the flow charts of FIGS. 1 and 2. The programming design language in conjunction with FIGS. 1 and 2 comprises the preferred operations carried out by the control program residing within the printer architecture embodying the method of the present invention.

In this preferred routine:

Tpm is the time to move paper from a selected paper tray to a laser printer. Tpm varies only with respect to which paper tray is selected.

Tm is the time for the printing system microprocessor to service laser printer imaging. Tm varies with the computing complexity of each page. For example, a page with a few lines of only text would typically have a small Tm, while a full page of complex graphs would have a large Tm. Because the laser printer requires continuous operation, the inkjet printing is interrupted as necessary to provide any Tm time required.

Tpi is the time to move paper from a selected paper tray to the inkjet printer. This includes movement of the paper through the laser printer even if no mono (black) printing is to occur. Since movement through the laser printer is continuous at a fixed rate, Tpi varies only with respect to which paper tray is selected.

Ti is the time for the inkjet printer to print the given page assuming the printing is not interrupted as discussed in the foregoing with respect to Tm.

TIMER: With the exception of when TIMER is decremented by step 150 of FIG. 1, TIMER represents the time remaining before full completion at both laser printing and inkjet printing. Accordingly, when a page having color is launched when TIMER is zero, setting timer to Ti+Tpi describes the time for that page to be completed. As shown in FIG. 1, a second page may be launched before TIMER is zero. When that occurs, inkjet printing may be interrupted to service laser printing, and such interruption could be as long as Tm. Accordingly, incrementing TIMER by Tm as done in step 120 of FIG. 1, adjusts TIMER so that its zero will assuredly represent that printing on the first color page is complete. When TIMER is decremented by Tpi in step 150, TIMER then is a direct representation of the time after which the next page can be launched with the previous page requiring no more time than the time for a launched page to reach the inkjet printer. Since Tm for the launched page was added to in step 130, the possibility that inkjet printing will be interrupted is taken into account.

START: The initiation of the FIG. 1 operation is a signal from the printer system that a paper may be fed, termed start. This signal occurs when the previous paper has been moved sufficiently, and START is the product of a page-separation mechanism which is a function of the printer system. When START is signaled, the operation of FIG. 1 is initiated and conducted repetitively so long as the START signal continues.

In the system of FIG. 1, it is not possible for an all black (mono) page to interfere with the inkjet printer as there is a mono paper exit which is entered prior to reaching the inkjet printer. If the prior page is color, inkjet printing of that page may be interrupted by the mono page, which is the reason for the increment of TIMER by Tm in step 50.

As shown in FIG. 1, a determination is made as to whether there is a page on top of the color queue. See block 10. If no such page is present, a check is made to determine whether there is a page in the mono queue. See block 20. As shown in FIG. 1, if the initial determinations result in no page being found in either queue, then repeated checks are made until a page is detected.

In the event that there is no page on top of the color queue, but a page is present in the mono queue, the next page to be printed ("Nextpage") is the page on top of the mono queue. Nextpage is cleared by being set equal to the page from the top of the mono queue (see block 30) and a check (represented by block 40) is made to determine whether the page currently being printed by the inkjet print engine will be completed before the media corresponding to Nextpage from the mono queue will reach the mono imaging point. If the page being printed by the inkjet print engine will be completely printed before the media corresponding to Nextpage reaches the mono imaging point, then the media corresponding to Nextpage is launched (see block 60), and the top page from the mono queue is removed (see block 65). Otherwise, Timer, which has the value of the predicted time until completion of the color page being printed, must be incremented by Tm, the time required to render a mono image onto a page (see block 50), before the media corresponding to Nextpage is launched and the top page from the mono queue is removed.

If in the initial check a page is found on top of the color queue (see block 10), then a determination is made as to the state of that page. See block 70. As noted herein, the top page of the color queue is in one of three states at any given moment: "unclassified," "waiting," or "ready." If the top color queue page is "waiting," then the procedure followed is the same as if no page were found on top of the color queue, beginning with the check represented by block 20 in FIG. 1. If the top page of the color queue is in a "ready" or "unclassified" state, then Nextpage, i.e., the next page to be printed, is set equal to the page from the top of the color queue. See block 80.

As shown in FIG. 2, the page on top of the color queue is put in a ready state (see block 230) when, after Timer has been decremented (see block 200), Timer has reached zero (see block 210) and the page on top of the color queue is in a "waiting" state (see block 220). A page in a ready state can be launched immediately. Accordingly, as shown in FIG. 1, once Nextpage is set equal to the page from the top of the color queue (see block 80), and it has been determined that Nextpage is in a "ready" state (see block 90), Timer is set to the sum of Ti plus Tpi (see block 100), the media corresponding to Nextpage is launched (see block 1 10), and the top page from the color queue is removed (see block 115). However, if Nextpage is not in a ready state, then Nextpage must be "unclassified." Under such circumstances a determination is made as to whether Timer will expire before the media corresponding to Nextpage reaches the mono imaging point. See block 120. If Timer will expire before the media corresponding to Nextpage reaches the mono imaging point, then the inkjet print engine will be free well before the media corresponding to Nextpage reaches it. In that case, it is safe to launch the media corresponding to Nextpage, so Timer is set to the sum of Ti and Tpi, the media corresponding to Nextpage is launched, and the top page from the color queue is removed. Otherwise, Timer is incremented by an amount equal to Tm, the time required to image the mono portion of Nextpage (see block 130).

With Timer incremented, the next determination made is whether Timer will expire before the media corresponding to Nextpage reaches the inkjet print engine. See block 140. If so, then the inkjet print engine will be free before the media corresponding to Nextpage reaches it, meaning that it is safe to set Timer (see block 100), launch the media corresponding to Nextpage (see block 110), and remove the top page from the color queue (see block 115). However, if the media corresponding to Nextpage will reach the inkjet print engine prior to the expiration of Timer, then Timer is decremented by Tpi, the amount of time required for the media corresponding to Nextpage to reach the inkjet print engine. See block 150. This allows Timer to reach zero at the point when the media corresponding to Nextpage can be launched instead of when the page being printed by the inkjet print engine would actually exit. Thus, Timer takes on a different meaning when there is a page in the "waiting" state. Nextpage assumes a "waiting" state (see block 160), and the procedure then repeats itself beginning with the initial check for a page on top of the color queue (see block 10).

Although the preferred embodiment of this invention has been described in some detail, it should be appreciated that a variety of embodiments will be readily available to persons utilizing the invention for a specific end use. For example, the present invention also may also be used in other paper-handling applications involving potential paper path bottlenecks. Such paper-handling applications typically are characterized by two processes taking place at different speeds, so that there is a potential for media pathway collisions or bottlenecking. For instance, one such application would include a shared finisher (e.g., a stapler) used by a number of mailboxes or output bins.

The present invention may also be used in other applications involving a plurality of processes which proceed simultaneously at different rates. A particular job first is analyzed and classified and the number of queues required for the application is determined. Sufficient queues are provided along with the required number of Timer and other variables as described herein for the application and the processes involved. For each queue, a determination is made as to the rate determining step of the processes associated with the queue. Typically, the values of the variables used correspond to the times required to complete the processes associated with each provided queue, and to the times required for media to travel from a starting point (typically a media source) to the work stations where the processes associated with each queue are carried out. Pages then are launched and tracked through the overall rate determining step so as to provide increased throughput in accordance with the present invention.

The description of the apparatus and method of this invention is not intended to be limiting on this invention, but is merely illustrative of the preferred embodiment of this invention. Other apparatus and methods which incorporate modifications or changes to that which has been described herein are equally included within this application. Additional objects, features and advantages of the present invention will become apparent by referring to the above description of the invention in connection with the accompanying drawings.

What is claimed is:

1. A printing method for use with a printer system including serially aligned mono-color and multi-color print engines, comprising:

providing page data from a computer, network connection, global information network or other such source;

creating page representations from said page data suitable for use by said mono-color and multi-color print engines;

separating said page representations into first and second printing queues corresponding to said mono-color and multi-color print engines, respectively; and consecutively tracking the time adequate to complete printing of pages launched from the second printing queue so that each page to be printed by said multi-color print engine is launched when said time adequate to complete printing is less than a predetermined amount and launching a page to be printed only by said mono-color print engine when said time adequate to complete printing is more than said predetermined amount.

2. The printing method as in claim 1 in which said mono-color printer is a laser printer which prints by continuous operation and said multi-color printer is an inkjet printer which prints with interrupted operation.

3. A printing control method for use with a printer system including serially aligned mono-color and multi-color print engines, comprising:

providing page data from a computer, network connection, global information network or other such source;

creating page representations from said page data suitable for use by said mono-color and multi-color print engines;

separating said page representations into first and second printing queues corresponding to said laser and inkjet print engines, respectively;

determining the minimum predicted time required to complete the printing of a page to be printed by said multi-color print engine;

adjusting said predicted time by the time the next page to be printed may interrupt the operation of said multi-color print engine; and controlling the passage of pages from the second printing queue through the multi-color inkjet print engine so that each page to be printed by said multi-color print engine is printed after the passage of said adiusted predicted time less a predetermined amount from the launching of a preceding multi-color page and printing a page to be printed only by said mono-color print engine when said adjusted predicted time from the launching of a preceding multi-color page is more than said predetermined amount.

4. The printing method as in claim 3 in which said mono-color printer is a laser printer which prints by continuous operation and said multi-color printer which prints with interrupted operation.

5. The printing method as in claim 3 in which said adjusted predicted time is at least the time after launch of the next multi-color page to reach said multi-color printer.

6. The printing method as in claim 4 in which said adjusted predicted time is at least the time after launch of the next multi-color page to reach said multi-color printer.

7. A printing method for use with a printer system including serially aligned first print engine which prints by continuous operation and followed by second print engine which prints with interrupted operation, comprising:

providing page data from a computer, network connection, global information network or other such source;

creating page representations from said page data suitable for use by said first print engine and said second print engine;

separating said page representations into first and second printing queues corresponding to said first print engine and said second print engine, respectively;

launching a first page to the printed by said second print engine from said second queue;

setting a timer to at least the minimum period to print said first page;

subsequently launching a second page to be printed by said first print engine while said first page is unfinished, increasing the value of said timing device by the time the printing of said next page may interrupt the printing of said first page; and launching a third page to be printed by said second print engine based on the value of said timer being equal or less than the time for said launched page to reach said second print engine.

8. The printing method as in claim 7 in which said first printer is a laser printer and said second printer is an inkjet printer.

* * * * *